US 7,975,797 B2

(12) United States Patent
Yuasa et al.

(10) Patent No.: US 7,975,797 B2
(45) Date of Patent: Jul. 12, 2011

(54) VEHICLE POP UP HOOD APPARATUS

(75) Inventors: Hitoshi Yuasa, Toyota (JP); Hiroyuki Takahashi, Aichi (JP); Hajime Kitte, Kiyosu (JP); Masashi Aoki, Kiyosu (JP); Toshikatsu Togawa, Kiyosu (JP); Toshinobu Tsuboi, Ogaki (JP)

(73) Assignees: Toyota Jidosha Kabushiki Kaisha, Toyota-shi, Aichi-ken (JP); Pacific Industrial Co., Ltd., Gifu (JP)

( * ) Notice: Subject to any disclaimer, the term of this patent is extended or adjusted under 35 U.S.C. 154(b) by 0 days.

(21) Appl. No.: 12/864,392

(22) PCT Filed: Jan. 23, 2009

(86) PCT No.: PCT/JP2009/051033
§ 371 (c)(1),
(2), (4) Date: Jul. 23, 2010

(87) PCT Pub. No.: WO2009/093674
PCT Pub. Date: Jul. 30, 2009

(65) Prior Publication Data
US 2010/0294584 A1    Nov. 25, 2010

(30) Foreign Application Priority Data

Jan. 25, 2008   (JP) .................................. 2008-015611

(51) Int. Cl.
*B60K 28/10* (2006.01)
(52) U.S. Cl. ...................................................... 180/274
(58) Field of Classification Search .............. 180/69.21, 180/274; 296/187.04, 193.11; B60R 21/34
See application file for complete search history.

(56) References Cited

U.S. PATENT DOCUMENTS 6,364,402 B1 *  4/2002  Sasaki ....................... 296/187.09
(Continued)

FOREIGN PATENT DOCUMENTS

JP          11-115680          4/1999
(Continued)

OTHER PUBLICATIONS

"Notice of Reasons for Rejection" in JP 2008-015611; Mailing Date: Mar. 3, 2009.

(Continued)

*Primary Examiner* — Paul N Dickson
*Assistant Examiner* — Robert A Coker
(74) *Attorney, Agent, or Firm* — Finnegan, Henderson, Farabow, Garrett & Dunner, LLP

(57) ABSTRACT

In a configuration in which a rod is extended by an actuator and raises a hood at a time of a collision with a collision body, when a collision load greater than a predetermined value is input to near a hood pushed up area, the collision energy is efficiently absorbed.

In a state in which a hood (12) is maintained in a pushed up position, when a collision load equal to or greater than a predetermined value is input from a hood upper side, a distal end portion (54) of a rod (20) slides towards a vehicle rear side along a pushed up surface (38) of a hood rear portion, while deforming the rod (20) by bending, thereby absorbing collision energy. At this time, before a base of a hinge arm (30) contacts a cowl top side (22), distal end portion (54) of rod (20) catches against a bending portion (60) such that rod (20) is bent further. As a result, when distal end portion (54) catches against bending portion (60), an intermediate reactive force is generated and a base contact load at a final stage of energy absorption can be decreased.

3 Claims, 9 Drawing Sheets

U.S. PATENT DOCUMENTS

| | | | |
|---|---|---|---|
| 6,499,555 B2 * | 12/2002 | Ishizaki et al. | 180/274 |
| 6,513,617 B2 * | 2/2003 | Sasaki et al. | 180/274 |
| 6,520,276 B2 * | 2/2003 | Sasaki et al. | 180/274 |
| 2002/0011371 A1 | 1/2002 | Sasaki et al. | |
| 2005/0257980 A1 | 11/2005 | Green et al. | |
| 2008/0156556 A1 * | 7/2008 | Takahashi | 180/69.21 |

FOREIGN PATENT DOCUMENTS

| | | |
|---|---|---|
| JP | 2002-29366 | 1/2002 |
| JP | 2002-29368 | 1/2002 |
| JP | 2002-370611 | 12/2002 |
| JP | 2004-203249 | 7/2004 |
| JP | 2004-308785 | 11/2004 |
| JP | 2005-225392 | 8/2005 |
| JP | 2006-143199 | 6/2006 |

OTHER PUBLICATIONS

International Search Report in International Application No. PCT/JP2009/051033; Mailing Date: Mar. 10, 2009.

* cited by examiner

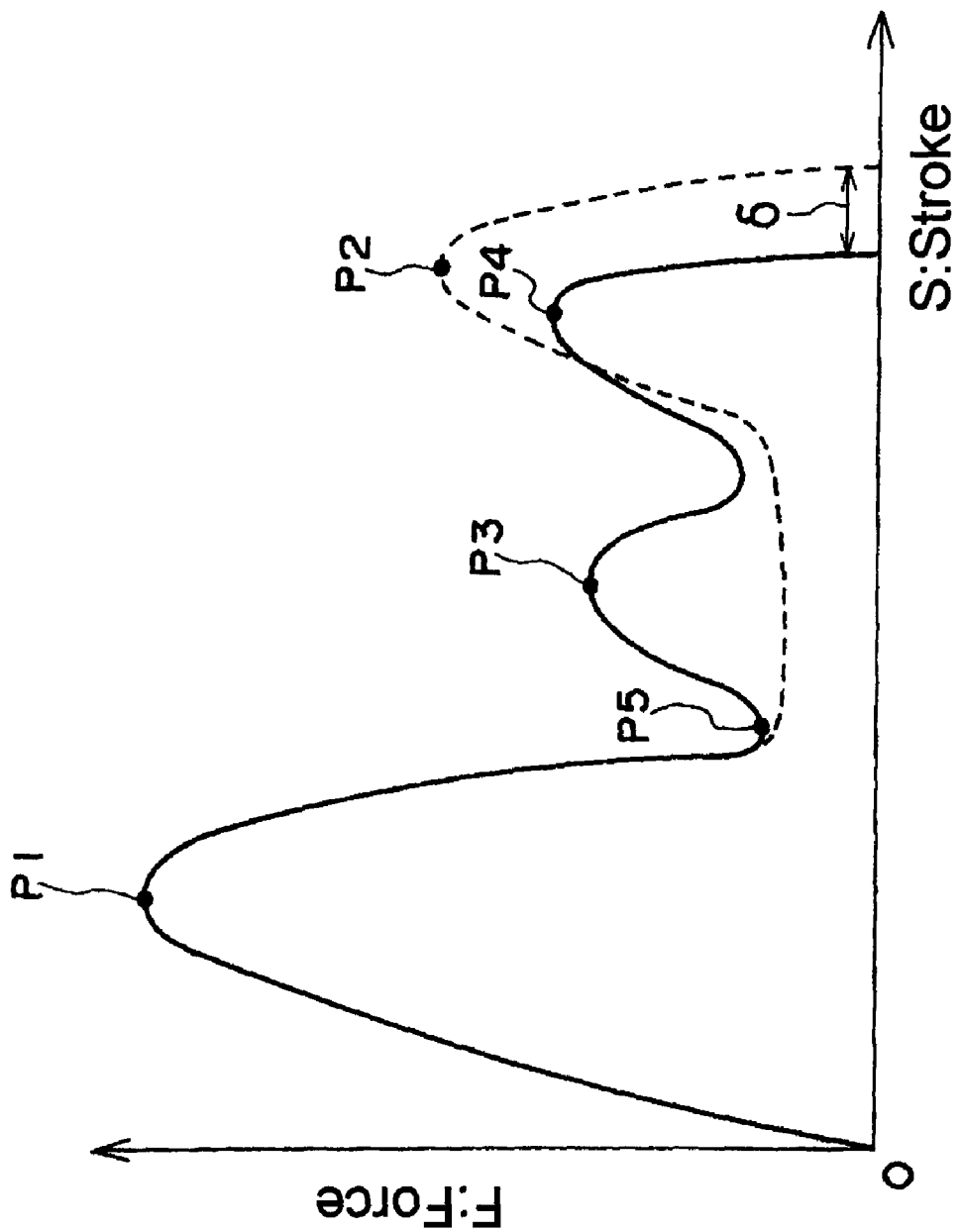

VEHICLE POP UP HOOD APPARATUS

CROSS-REFERENCE TO RELATED APPLICATIONS

This application is a national phase application of International Application No. PCT/JP2009/051033, filed Jan. 23, 2009, and claims the priority of Japanese Application No. 2008-015611, filed Jan. 25, 2008, the contents of both of which are incorporated herein by reference.

TECHNICAL FIELD

The present invention relates to a vehicle pop up hood apparatus.

BACKGROUND ART

Recently, for the safety of pedestrians, a vehicle pop up hood apparatus has been developed in which, when a vehicle collides with a collision body such as a pedestrian, a rear end portion of a hood is raised up and the collision body is received by the hood, and a shock of the collision body is absorbed by the hood. For example, in the vehicle pop up hood apparatus disclosed in cited document 1, a pair of left and right hood hinges are provided at both sides of a rear end portion of a hood, when a collision occurs with a collision body, actuators provided near the hood hinges actuate, and a hood side link of each hood hinge is raised upwards by a raising rod.

However, when only the rear end portion of the above hood is raised, if a collision body collides near the position at which the hood is raised, since the raising rod pushes this area, a large reaction load force may act upon the collision body. Therefore, it is desirable for a separate energy absorbing mechanism to be added to the vehicle pop up hood apparatus, so that a specific amount of energy can be absorbed in cases such as the above.

In cited document 2, a technique is disclosed in which an energy absorbing mechanism is added to an actuator that operates a vehicle safety apparatus at a time of collision. In brief, when a load in an axial direction equal to or greater than a specific value is input to a distal end portion of a piston rod, a plastically deformable portion provided at the piston rod is crushed, and thereby the piston rod contracts within (moves relative to) a cylinder. Thus, it is conceivable that by using the actuator of cited document 2 with the vehicle pop up hood apparatus of cited document 1, the above needs might be satisfied.

Cited document 1: Japanese Patent Application Laid-Open (JP-A) No. 2005-225392
Cited document 2: Japanese Patent Application Laid-Open (JP-A) No. 2004-308785

DESCRIPTION OF THE INVENTION

Problem to be Solved by the Invention

However, in a mechanism that absorbs energy via plastic deformation between the piston rod and the cylinder, variations in the accuracy of dimensions thereof causes variations in the energy absorbing performance (loss occurs). Further, if the direction of operation of a load which is input to a piston rod deviates from the axis of the piston rod, the piston rod does not contract smoothly into the cylinder, and an energy absorbing effect due to plastic deformation may not be sufficiently obtained.

The present invention considers the above facts, and aims to provide a vehicle pop up hood apparatus that can absorb collision energy with high efficiency when a collision load of a specific value or greater is input to an area near a hood pushed up position, in a configuration in which a rod is extended and a hood is pushed up by the operation of an actuator at a time of collision with a collision body.

Means for Solving the Problem

The first embodiment of the present invention is a vehicle pop up hood apparatus, including: an actuator mounted at a vehicle; a rod that extends towards a hood upper side as a result of operation of the actuator, pushes a hood rear portion, which is supported such that it may open and close with respect to a vehicle side via a hood hinge, towards a hood upper side, and maintains the hood at a pushed up position; an energy absorbing mechanism portion, which, in a state in which the hood is maintained in the pushed up position, when a collision load equal to or greater than a predetermined value acts from a hood upper side upon an area near a pushed up region pushed up by the rod, slides a distal end portion of the rod towards a vehicle rear side along a pushed up surface of a hood rear portion, while deforming the rod by bending, thereby absorbing energy from a collision body; in which between a point at which a first period peak load is generated before the rod begins to bend, and a point at which a final period peak load is generated when a hood lowers and a base of a hood side attachment member of a hood hinge contacts another element, an angle θ between an axis of the rod and the pushed up surface changes from increasing to decreasing, thereby increasing sliding resistance and generating an intermediate peak load.

The second embodiment of the present invention is the vehicle pop up hood apparatus of the first embodiment, in which the rod is housed in a housing of the actuator that pushes up the rod, and the hood side attachment member of the hood hinge has an approximate "Z" shape when seen from a hood side direction, and a projecting length b of the rod from the housing is longer than a length a from a pushed up position of the hood side attachment member pushed up by the rod, to a bending portion of the hood side attachment member.

According to the first embodiment, when an actuator mounted at a vehicle operates, a rod extends towards a vehicle upper side, and a hood rear portion is pushed towards a hood upper side and maintained at that position.

In this state of being maintained in a pushed up position, when a collision load equal to or greater than a predetermined value acts from a hood upper side upon an area near a pushed up region pushed up by the rod, a predetermined collision energy is absorbed by an energy absorbing mechanism portion. Specifically, a distal end portion of the rod slides towards a vehicle rear side along a pushed up surface of a hood rear portion, and the rod deforms by bending. Thereby, collision energy is absorbed. In other words, in the present invention, a configuration is adopted in which the distal end portion of the rod is made to slide towards a vehicle rear side along a pushed up surface of a hood rear portion, and using this sliding movement, the rod is deformed and bent and energy is absorbed, and energy absorption loss can be greatly decreased compared with a conventional configuration in which, due to dimensional accuracy, the manner of plastic deformation changes, and, depending on the direction of the input load, a piston rod does not undergo relative movement smoothly into a cylinder.

In particular, in the present invention, between a point at which a first period peak load is generated before the rod begins to bend, and a point at which a final period peak load is generated when a hood lowers and a base of a hood side attachment member of a hood hinge contacts another element, an angle θ between an axis of the rod and the pushed up surface changes from increasing to decreasing, thereby increasing sliding resistance and generating an intermediate peak load, and the peak value of a final period load can be decreased.

In other words, generally, when a rod is deformed and bent to absorb energy, since a sufficient reaction force can be obtained until immediately before the rod bends and deforms, it is possible to absorb energy efficiently. However, when the rod begins to bend, the reaction force tends to decrease. If the reaction force decreases and a base of a hood side attachment member of a hood hinge contacts another element, thereby generating a base contact load, although not as large as an initial peak load, a reaction force load input to a collision body nevertheless increases. In the present invention, since between a point at which a first period peak load is generated, and a point at which a final period peak load is generated, an angle θ between an axis of the rod and the pushed up surface changes from increasing to decreasing, thereby increasing sliding resistance and generating an intermediate peak load, assuming the amount of energy to be absorbed does not change, it is possible to reduce the peak value of a final period peak load.

According to the second embodiment of the present invention, since a projecting length b of the rod from the housing is longer than a length a from a pushed up position of the hood side attachment member pushed up by the rod, to a bending portion of the hood side attachment portion, when the distal end portion of the rod contacts the bending portion of the hood side attachment member, a reaction force (an intermediate load) increases.

Effects of the Invention

As described above, the vehicle pop up hood apparatus according to the first embodiment has the excellent effect of being able to absorb collision energy with high efficiency when a collision load of a specific value or greater is input to an area near a hood pushed up position, in a configuration in which a rod is extended and a hood is pushed up by the operation of an actuator at a time of collision with a collision body.

The vehicle pop up hood apparatus according to the second embodiment has the excellent effect of being able to effectively suppress a decrease in energy absorbance efficiency.

BRIEF DESCRIPTION OF THE DRAWINGS

FIG. 7 is a graph showing load-deflection characteristics when the vehicle pop up hood apparatus according to the present embodiment is used, and when a contrasting example is used.

BEST MODE FOR IMPLEMENTING THE INVENTION

A first embodiment of the vehicle pop up hood apparatus according to the present invention is explained below with reference to FIGS. 1-9. Further, where shown, the arrow FR indicates a vehicle front side, the arrow UP indicates a vehicle upper side, and the arrow IN indicates a vehicle inner side in a width direction.

Figure 1:
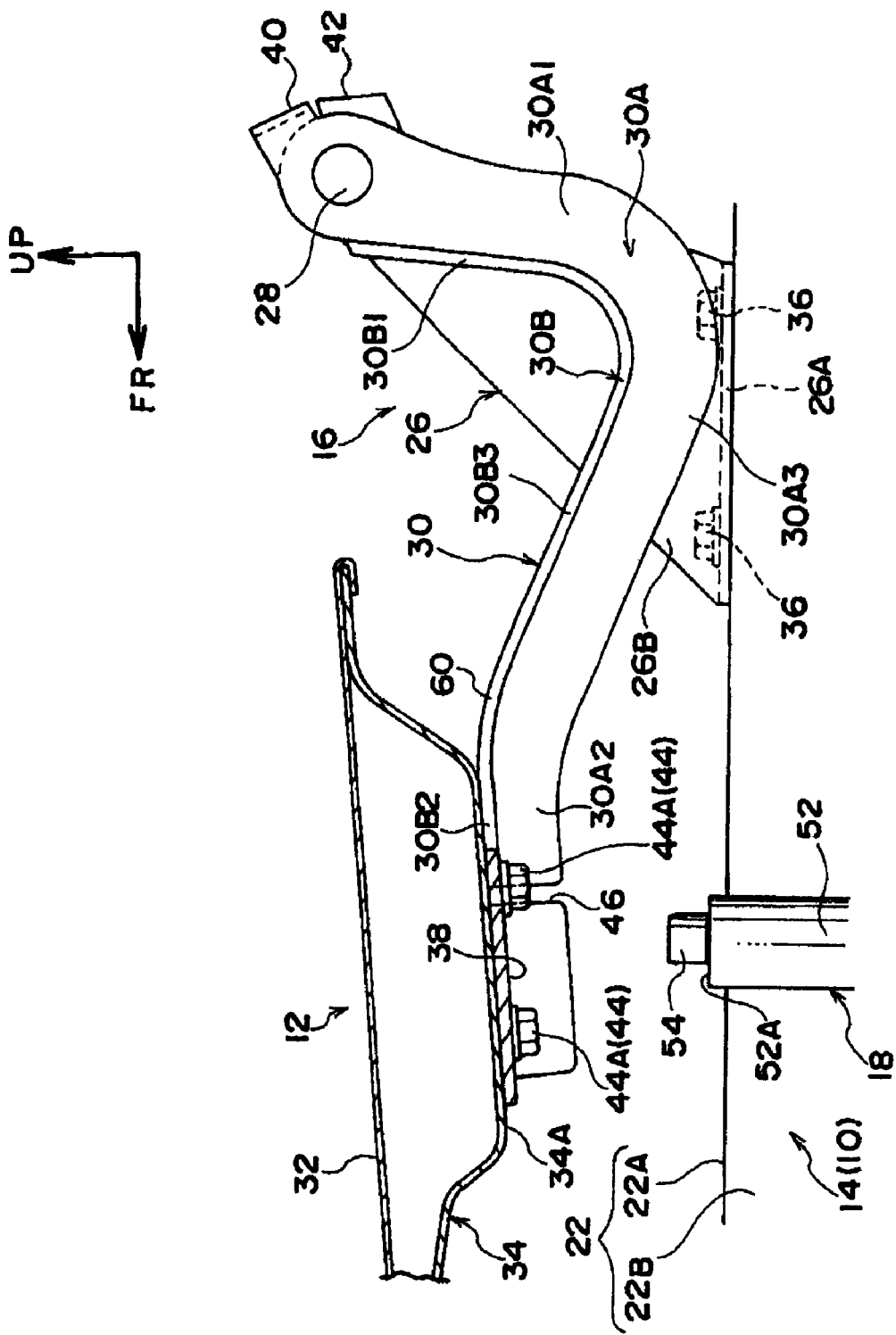
FIG. 1 is an enlarged side view showing a normal state of a pop up mechanism portion provided at a right side as seen from a driver, in the vehicle pop up hood apparatus according to the first embodiment.
Figure 2:
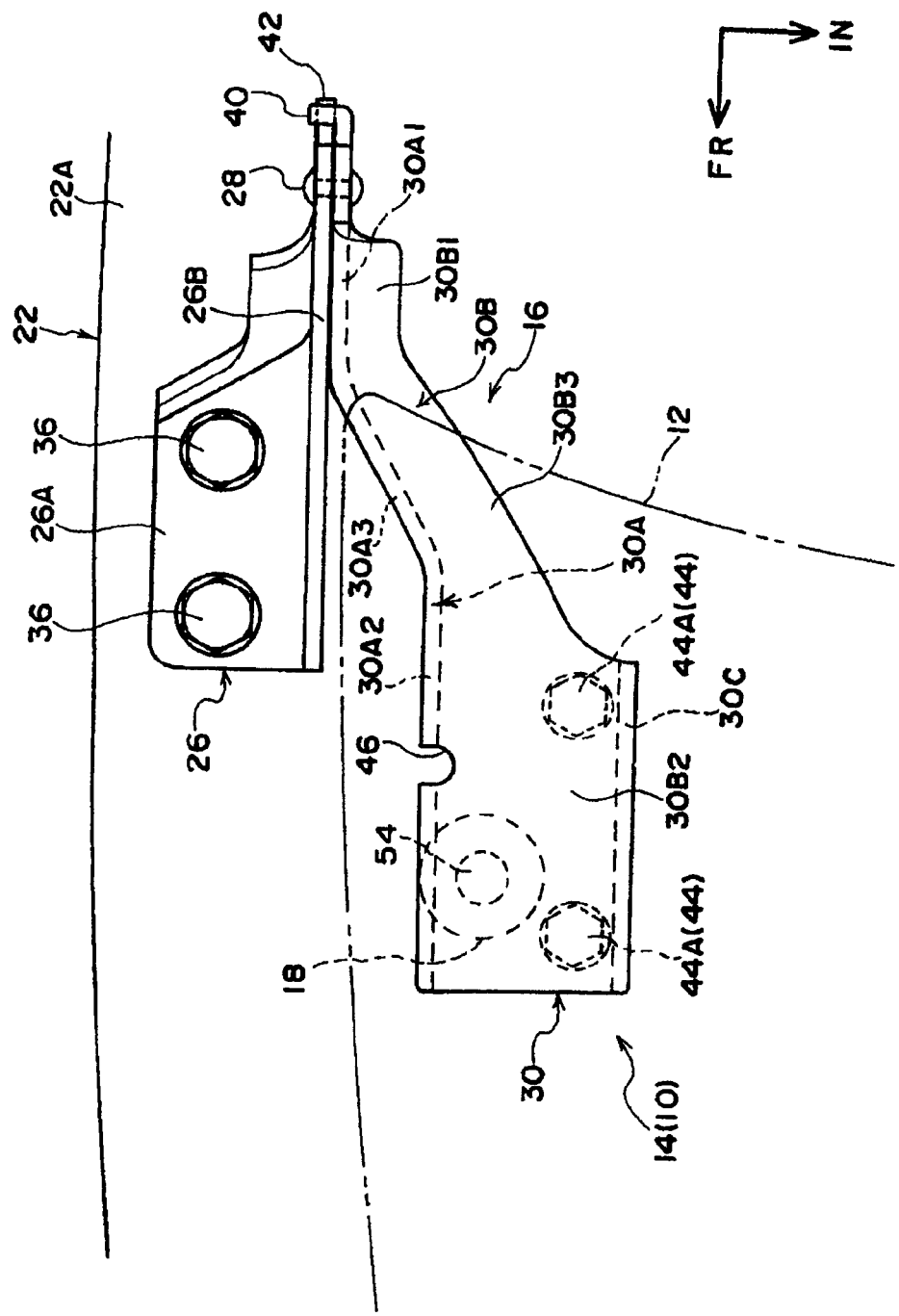
FIG. 2 is an enlarged plane view showing the normal state of a pop up mechanism portion provided at a right side as seen from a driver.
Figure 3:
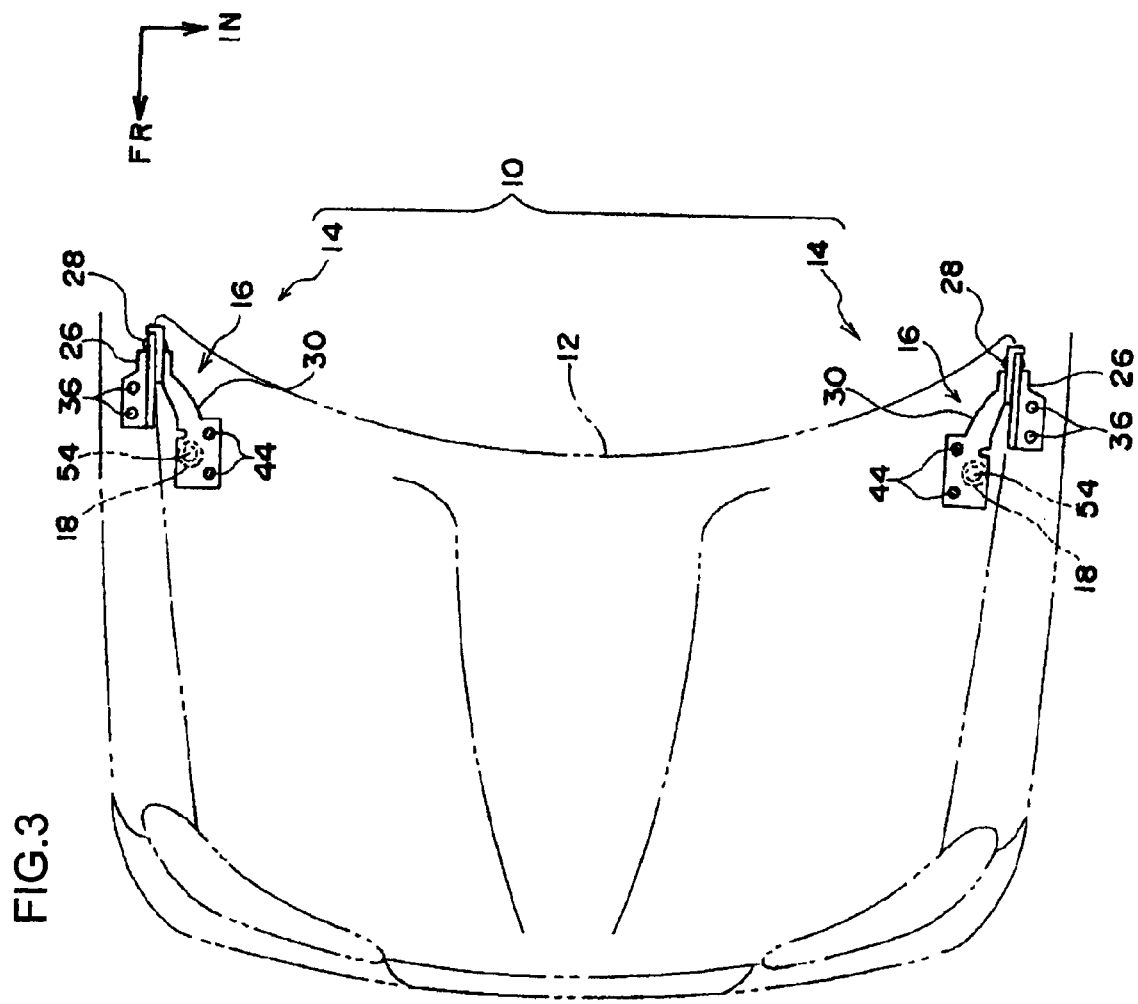
FIG. 3 is a plane view showing the overall structure of the vehicle pop up hood apparatus of FIG. 1.

FIG. 3 is a plane view showing the overall structure of the vehicle pop up hood apparatus according to the first embodiment. FIG. 2 is an enlarged plane view showing the normal state of a pop up mechanism portion provided at a right side as seen from a driver in a right hand drive vehicle (hereinafter abbreviated as "right side as seen from a driver"). FIG. 1 is an enlarged side view showing the normal state of a pop up mechanism portion provided at a right side as seen from a driver, when seen from an engine room side, in the vehicle pop up hood apparatus according to the first embodiment.

As shown in these figures, vehicle pop up hood apparatus 10 is configured to include as main portions a pair of left and right pop up mechanism portions 14, provided respectively at both rear end sides of a hood 12 that opens and closes an engine room. Since left and right pop up mechanism portions 14 have identical configurations, the following only explains the configuration of the pop up mechanism portion 14 provided on the right side as seen from a driver, and explanation of the configuration of the pop up mechanism portion 14 provided on the left side as seen from a driver is omitted.

Pop up mechanism portion 14 includes a hood hinge 16 that supports hood 12 so that it may open and close, an actuator 18 that operates at a time of collision with a collision body such as a pedestrian, and a rod 20 that moves in an axial direction towards a hood upper side due to the operation of actuator 18. These structural elements are explained below in the above order.

Configuration of Hood Hinge 16

Hood hinge 16 includes a hinge base 26 fixed by an attachment bolt 36 (described below) to an upper surface portion 22A of a cowl top side 22, which is a vehicle body side structural member provided at both sides of a cowl that extends along a vehicle width direction between a rear end side of hood 12 and a lower edge portion of a windshield glass, and a hinge arm 30 as a hood side attachment member which connects hinge base 26 and a rear end expanded portion 34A (described below) of hood 12, and which is connected to hinge base 26 so as to be able to rotate relative thereto by a hinge pin 28 (which is a center of a rotational axis).

Hood 12 includes a hood outer panel 32 that forms a design surface arranged at a vehicle outer side, a hood inner panel 34 that is arranged at an engine room side and that reinforces hood outer panel 32, and these two panels are joined at edge portions thereof by a hemming process. A rear end side of hood inner panel 34 expands towards a lower side, thereby forming a rear end expanding portion 34A at a rear end side of hood 12. Hood hinge 16 is conventionally a hinge part for supporting hood 12 such that it can open and close with respect to a body; however, in the present embodiment, it also forms an element of vehicle pop up hood apparatus 10.

Turning to a more specific explanation of the configuration of each portion, as shown in FIGS. 1 and 2, hinge base 26 has a substantially "L" shape as seen from a vehicle front, and includes an attachment portion 26A that extends along a vehicle front-rear direction and has a narrow plate shape, a support portion 26B that bends from an end portion in a vehicle width direction of attachment portion 26A, towards a vehicle upper side, and has a substantially trapezoidal shape as seen from the side. Attachment portion 26A is fixed to upper surface portion 22A of cowl top side 22 by an attachment bolt 36.

Hinge arm 30 is an elongated member that extends along a vehicle front-rear direction, and that has a substantially "L" shape as seen from the side (a "tick" shape). Hinge arm 30 includes a side wall portion 30A, arranged substantially parallel to support portion 26B of hinge base 26, a top wall portion 30B, which is formed to be bent from a top edge portion of side wall portion 30A towards a hood width direction central side, and which is arranged to be substantially parallel to rear end expanding portion 34A of hood 12. Hinge arm 30 has a vertically reversed "L" shape when seen in a longitudinal cross section. A front portion lower surface of top wall portion 30B, which is pushed up by a distal end portion (push portion 54) of rod 20 (described below), and along which the distal end portion (push portion 54) slides, is defined as a pushed up surface 38. In practice, however, rod 20 (described below) moves in an axial direction towards a hood upper side, and a surface which is further to a hood front side than a position at which push portion 54 of the distal end portion contacts (see the position indicated in FIG. 4), is not used as a sliding surface.

Further, an inner side edge of a front end portion of top wall portion 30B bends towards a lower side, forming a pair of flanges parallel with side wall portion 30A. Thus, a front end portion of hinge arm 30 has a substantially "U" shape when seen in a sectional view.

As shown in FIG. 2, side wall portion 30A of the above hood hinge 16 includes a rear portion 30A1 provided adjacent to a vehicle width direction inner side of support portion 26B of hinge base 26, a front end portion 30A2, which is provided at a position offset towards a hood width direction center side with respect to rear portion 30A1, and which extends towards a hood front side, and an intermediate portion 30A3, which joins at an angle rear portion 30A1 and front portion 30A2. Top wall portion 30B of hood hinge 16 has a corresponding configuration, and includes a rear portion 30B1 provided at a support portion 26B side of hinge base 26, a front portion 30B2, which is superposed with and contacts a lower surface of rear end expanding portion 34A of hood 12, and intermediate portion 30B3 which joins at an angle rear portion 30B1 and front portion 30B2.

A rear end portion of side wall portion 30A of hinge arm 30 is hinge-connected to an upper end portion of support portion 26B of hinge base 26 by hinge pin 28. As a result, hinge arm 30 is rotatable in a vehicle vertical direction with hinge pin 28 as a rotational axis. At a rear end portion of side wall portion 30A, a stopper 40, which is bent into a hook shape and which is for limiting a degree of opening, projects in a radial direction. In correspondence therewith, a limiter 42 for limiting a degree of opening, which limits the rotation of hinge arm 30 such that it may not rotate beyond the point at which limiter 42 interferes with stopper 40, is integrally provided at an upper end portion of support portion 26B of hinge base 26.

Front portion 30B2 of top wall portion 30B of hinge arm 30 extends in substantially a vehicle front-rear direction along a lower surface of rear end expanding portion 34A of hood 12, and is fastened (fixed) to expanding portion 34A of hood 12 at two points at the front and rear respectively by a hinge bolt 44 and a weld nut (not shown) which are fastening elements. The fastening direction of hinge bolt 44 is a hood vertical direction, and upon attachment thereof, hinge bolt 44 is inserted by screwing into the weld nut (not shown) from a hood lower side. As a result of fastening hinge bolt 44, a bolt head portion 44A of hinge bolt 44 is arranged so as to protrude towards a hood lower side from a lower surface of top wall portion 30B (see FIG. 1).

In addition, at side wall portion 30A, at a position opposing bolt head portion 44A of hinge bolt 44 provided at a hood rear side, is formed a cutaway 46 which has a substantially rectangular shape when seen in a side view. Cutaway 46 is cut away from a lower edge side towards an upper edge side of side wall portion 30A. Cutaway 46 is formed at a ridge line that is a connection region between top wall portion 30B and side wall portion 30A.

In terms of the function of hinge arm 30 having a configuration such as the above, rear portion 30A1 of side wall portion 30A functions as hinge side connection portion, front portion 30B2 of top wall portion 30B functions as a hood side connection portion, and hinge arm 30 can be said to be an element that has both of these functions.

Configuration of Actuator 18

Actuator 18 has a substantially cylindrical shape, and is provided below a front portion of pushed up surface 38 at top wall portion 30B of hinge arm 30 when seen in plane view, and has a substantially vehicle vertical direction as an axial direction. A bracket (not shown) is provided integrally to actuator 18, the bracket being fixed by a bolt to a side surface portion 22B of cowl top side 22. At an inner portion of housing 52 of actuator 18 is a gas generating means configured with a gas generating agent, and a starter device that combusts the gas generating agent and causes it to generate gas. As an alternative to a type that uses a gas generation agent, a type in which high pressure gas is filled into housing 52, and the operation of a starter device breaks a wall which encloses the high pressure gas, may also be used.

The starter device that operates actuator 18 is connected to an ECU (control means; not shown) provided at a lower side or the like of a console box. The ECU is provided at a front bumper or the like, and is connected to a collision detection sensor (collision detection means) that detects or predicts a collision with a collision body such as a pedestrian Configuration of Rod 20

Rod 20 is housed in housing 52 of actuator 18 and has the same axis. Rod 20 is a member having a straight rod shape, and at a lower end portion thereof is provided with a piston (not shown) housed snugly inside housing 52. Gas generated inside housing 52 acts as a driving force with respect to the piston. At an upper end portion of rod 20 is attached push portion 54 which has a larger diameter than rod 20. Push portion 54 is provided so as to vertically oppose a position near a front end portion of pushed up surface 38 of top wall portion 30B. Specifically, as shown in FIG. 2, push portion 54 is provided at a hood width direction outer side of pushed up surface 38. In other words, push portion 54, when seen in a vehicle plane view, is provided at a position offset in a hood width direction with respect to the pair of front and rear hinge bolts 44 (at a position where it does not overlap therewith), and is also provided between the pair of front and rear hinge bolts 44 (near the hinge bolt 44 at a hood front side). This positional relationship is employed because the vehicle mounting space thereof is limited due to surrounding parts, and the like.

Relationship Between Hinge Arm 30 and Rod 20

Figure 6:
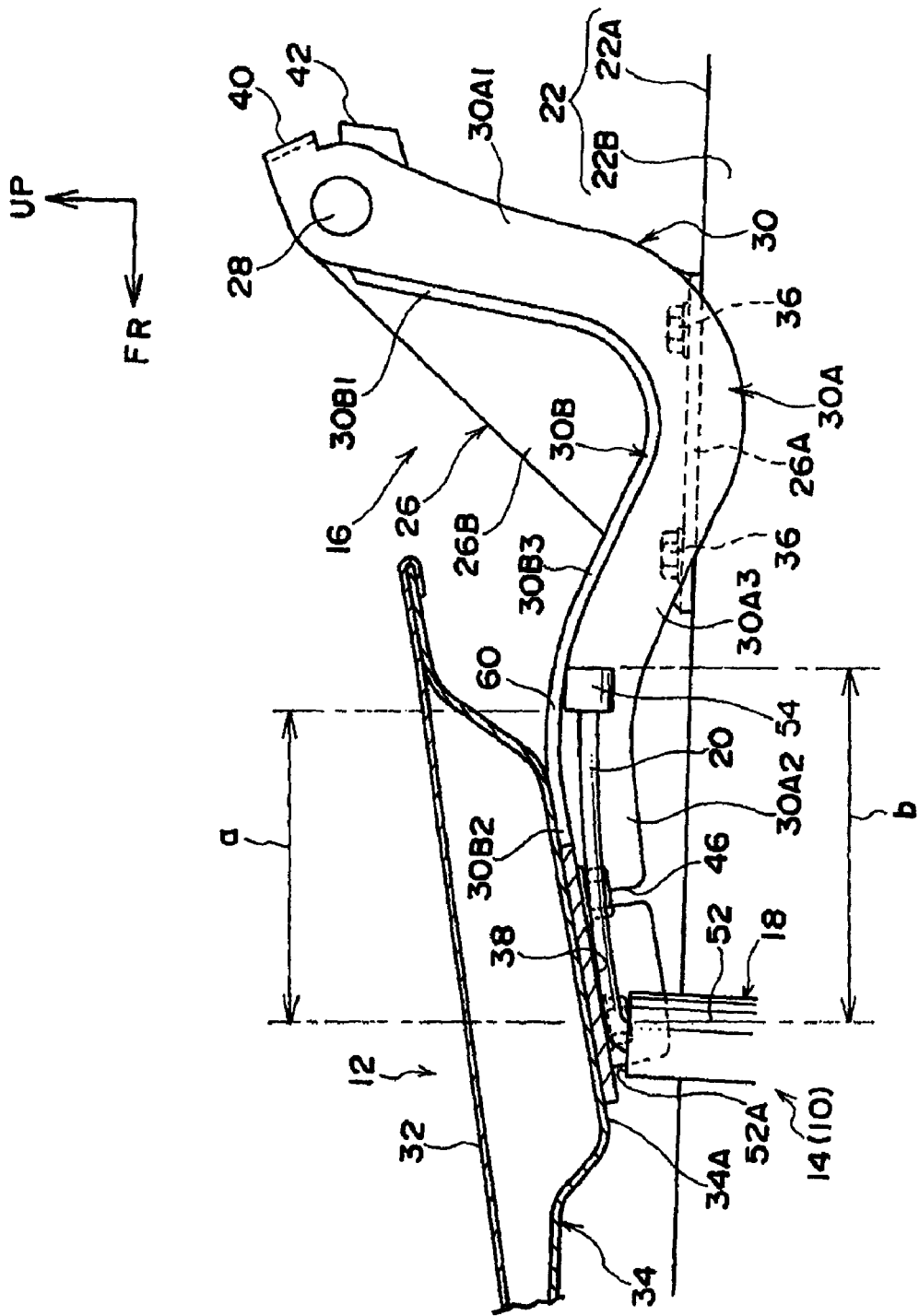
FIG. 6 is a side view showing a state after the state shown in FIG. 5, in which a base of a hinge arm contacts an actuator side (a bending portion at the base of the rod) and the rod is completely bent.

A bent portion 60 is formed at the region at which the above-described front portion 30A2 and front portion 30B2 connect with intermediate portion 30A3 and intermediate portion 30B3. As shown in FIG. 6, taking "a" to be a length from a position at which push portion 54 of a distal end portion of rod 20 contacts pushed up surface 38 of hinge arm 30, to bent portion 60, and taking "b" to be a length of rod 20 (including push portion 54), the dimensions of "a" and "b" are set such that "a<b" is satisfied.

Operation and Effects of the Present Embodiment

Next, the operation and effects of the present embodiment will be explained.

As shown in FIG. 1, when vehicle pop up hood apparatus 10 is not operating, since actuator 18 is not operating, rod 20 is housed in housing 52 of actuator 18 (in a state in which a lower surface of push portion 54 contacts an upper end portion 52A of housing 52 of actuator 18). As shown in FIG. 2, push portion 54 of a distal end portion of rod 20 is positioned so as to be directly under a front end side of pushed up surface 38 at top wall portion 30B of hinge arm 30, and at a position offset in a hood width direction with respect to hinge bolt 44 (see FIG. 2).

In this state, in a frontal collision with a collision body such as a pedestrian, the frontal collision is detected by a collision detecting means (not shown) and a collision signal is output to an ECU (not shown). At the ECU, based on the input collision signal, it is determined whether to operate vehicle pop up hood apparatus 10, and if it is determined that vehicle pop up hood apparatus 10 should be operated, an operation signal is output to actuator 18. As a result, an ignition device (not shown) of actuator 18 ignites, and combusts a gas generation agent, and generates a predetermined amount of gas in housing 52. Further, if actuator 18 is a type in which high pressure gas is enclosed, a wall breaks due to the operation of an ignition device, or the like, and a predetermined amount of gas is generated in housing 52 thereby. If a pre-crash sensor is installed, the above operations are performed at a stage at which a frontal collision is predicted.

Figure 4:
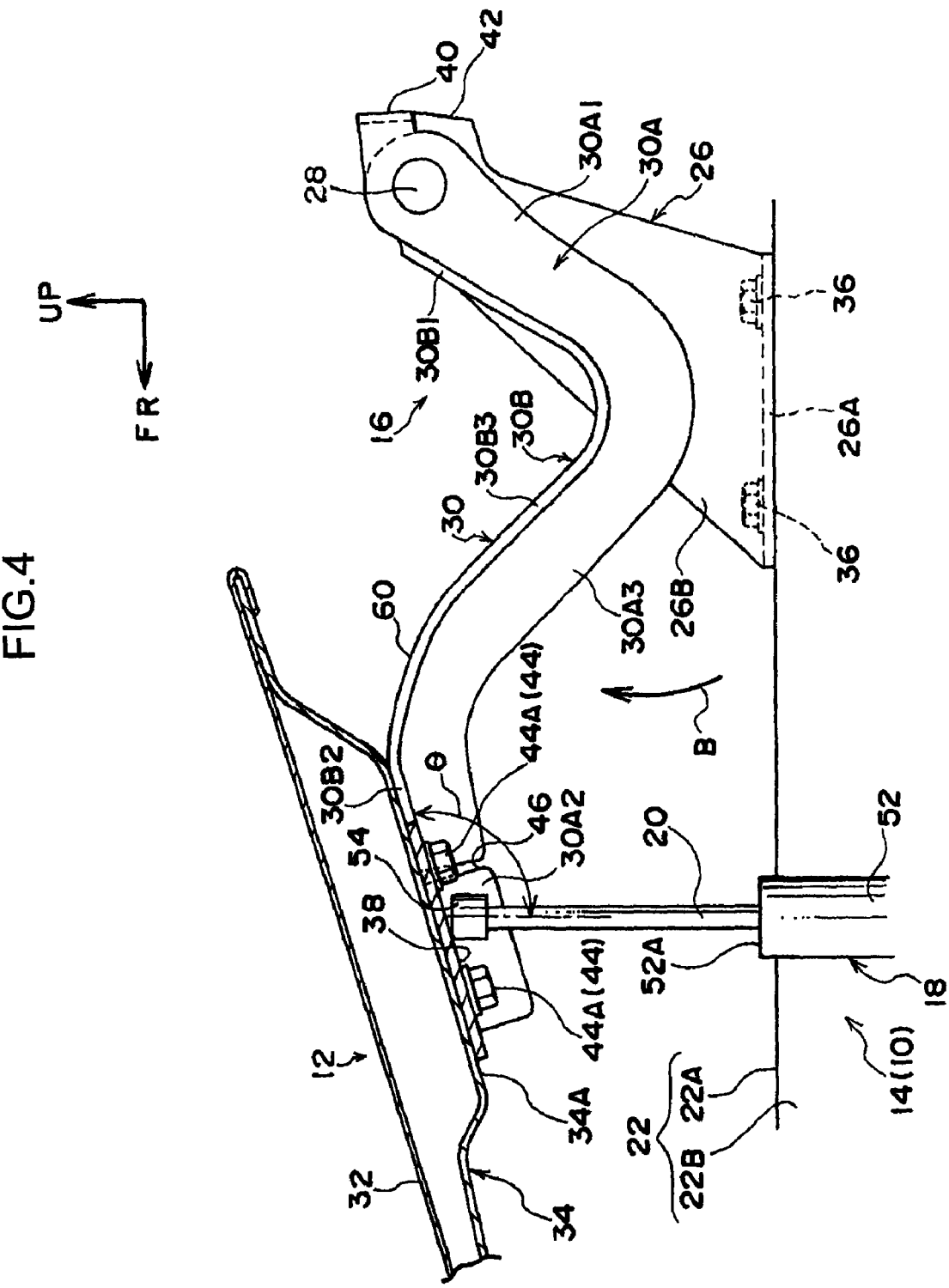
FIG. 4 is a side view showing a state after the state shown in FIG. 1, in which the pop up mechanism portion operates and is maintained in a pushed up position.

The gas generated as described above operates on a piston which is housed snugly in housing 52, and pushes the piston towards an axial direction distal end side of housing 52 (that is, towards a hood upper side). Since a lower end portion of rod 20 is connected to the piston, when the piston rises within housing 52, rod 20 moves in an axial direction towards a hood upper side. As a result, as shown in FIG. 4, push portion 54 at a distal end portion of rod 20 contacts pushed up surface 38 of hinge arm 30, and moves hinge arm 30 around hinge pin 28 in a clockwise direction as seen in FIG. 4 (in the direction of arrow B). Thereby, a rear end side of hood 12 (rear end expanding portion 34A) is pushed up in a hood upper direction. At this time, at a front portion 30A2 side of side wall portion 30A of hinge arm 30, the strength of a formed region of cutaway 46 is less than other regions, and therefore hinge arm 30 bends starting from cutaway 46. Since a rotational stroke of hinge arm 30 is limited by stopper 40 formed at a rear end portion of side wall portion 30A contacting with limiter 42 of hinge base 26, hinge arm 30 does not rotate more than a predetermined amount. In other words, the pop up amount (lift up amount) of a rear end side of hood 12 is determined in advance.

Figure 5:
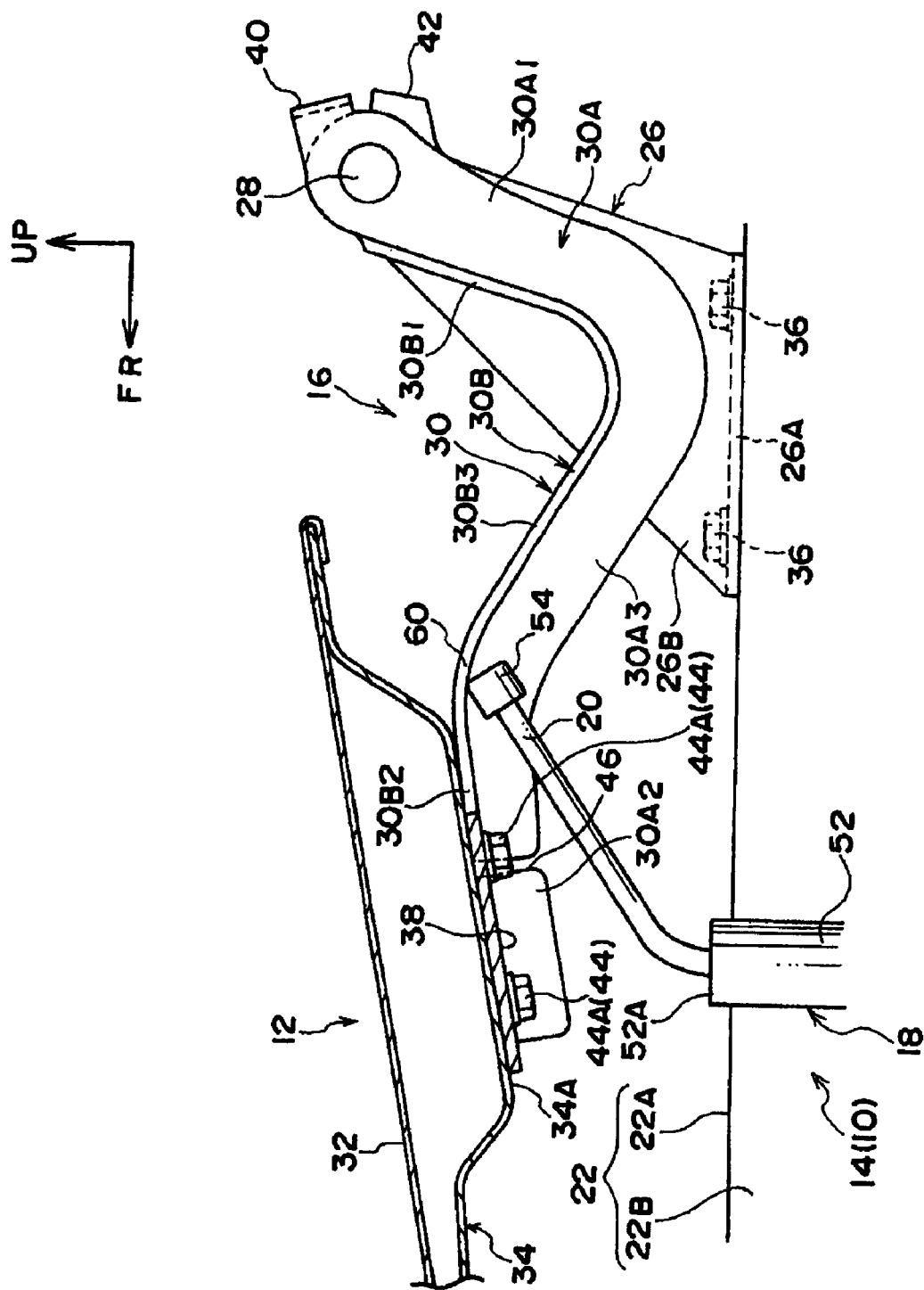
FIG. 5 is a side view showing a state after the state shown in FIG. 4, in which a collision load has been input and a rod has bent to an intermediate position.

When hood 12 is held in the pushed up position shown in FIG. 4, and a collision load above a predetermined value acts from a hood upper side to near a pushed up position of hood 12 effected by rod 20, then as shown in FIG. 5, push portion 54 at a distal end portion of rod 20 slides towards a vehicle rear side along pushed up surface 38 of hinge arm 30. Then, together with the sliding of push portion 54 of rod 20 along pushed up surface 38 of hinge arm 30 towards a vehicle rear side, rod 20 undergoes a bending deformation (a plastic deformation) from the base thereof. Due to the bending deformation of rod 20 at this time, collision energy is absorbed, and a load input to a collision body (reaction force) is reduced. Further, when push portion 54 of rod 20 slides along pushed up surface 38, cutaway 46 of side wall portion 30A of hinge arm 30 is deformed in an opening direction thereof.

When push portion 54 slides to bent portion 60 of hinge arm 30, a corner of push portion 54 is caught by bent portion 60 (that is, sliding resistance increases rapidly and a braking effect is applied thereto). If hood 12 drops down further from this state, then as shown in FIG. 6, push portion 54 exceeds bent portion 60, and slides further along pushed up surface 38. Subsequently, a lower end portion of hinge arm 30 contacts a bending portion of a base of rod 20, or contacts upper end portion 52A of housing 52. In other words, at an intermediate stage between from when push portion 54 at a distal end portion of rod 20 contacts pushed up surface 38 of hinge arm 30, to when a lower end portion of hinge arm 30 contacts a bending portion of a base of rod 20, or contacts upper end portion 52A of housing 52, a change in an angle θ between an axis of rod 20 and pushed up surface 38 (see FIG. 4 and FIG. 8) reverses from increasing to decreasing, and thereby sliding resistance increases, and an intermediate load increases. The phrase "an angle between pushed up surface 38 and an axis of rod 20" indicates two angles, an angle of a vehicle rear side with respect to an axis of rod 20 and an angle of a vehicle front side with respect to an axis of rod 20; however, as described herein, "an angle between pushed up surface 38 and an axis of rod 20" indicates the former angle, which is an obtuse angle.

The above will now be explained using FIG. 7. In the load-stroke characteristics shown in FIG. 7, when hood 12 is maintained in a pushed up position, and a load equal to or greater than a predetermined value acts from an upper side to an area near a pushed up position of the hood, the load (reaction force) increases until rod 20 begins to deform by bending, and just before it deforms by bending it reaches a peak load (P1). When rod 20 begins to bend, the load decreases rapidly, and in a case in which the structure of the present invention is not used, which is indicated by a broken line in the graph, when energy absorption reaches a final period, the load bottoms out and then begins to increase, then reaches another peak (P2), and then ends. In the graph, both the actual line and the broken line are drawn with exaggeration.

By contrast, when the present structure is used, rod 20 interferes with bent portion 60 between P1 and P2, and the load (reaction force) increases again, and an intermediate peak load (P3) is generated. As a result, supposing the total amount of energy to be absorbed is the same (the area enclosed by the graph curve and horizontal axis), it becomes possible to reduce a peak load at a final period of a collision from P2 to P4, and a deformation stroke can be reduced to only δ. As a result, when a collision load equal to or greater than a predetermined value is input to an area near a hood pushed up position at a time of collision with a collision body, it is possible to efficiently absorb collision energy in a configuration in which the operation of actuator 18 extends rod 20 and pushes up hood 12.

Figure 8A:
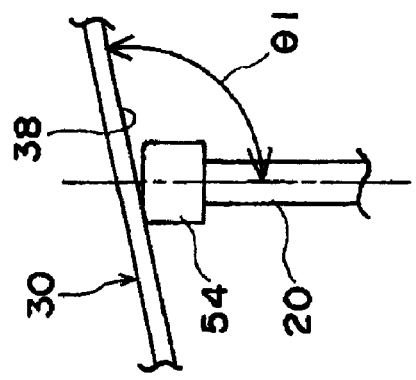
FIG. 8A is an explanatory view for explaining how an angle changes between an axis of the rod and a pushed up surface.
Figure 8B:
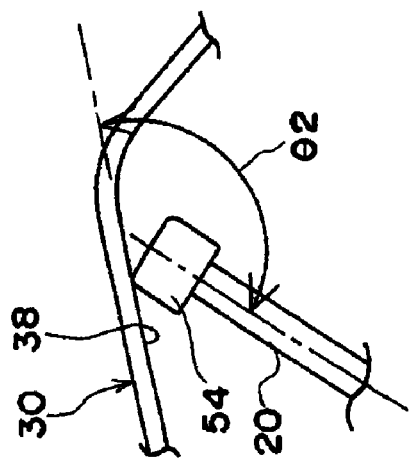
FIG. 8B is an explanatory view for explaining how an angle changes between an axis of the rod and a pushed up surface.
Figure 8C:
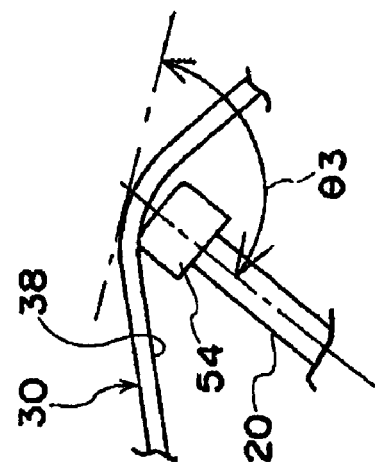
FIG. 8C is an explanatory view for explaining how an angle changes between an axis of the rod and a pushed up surface.

The above operation and effects will now be further explained in relation to the abovementioned "angle θ between pushed up surface 38 and an axis of rod 20". The state of rod 20 shown in FIG. 8(A) is a state at a time when an initial collision load increases to a peak (a peak load is generated). This corresponds to point P1 in the graph shown in FIG. 7. At this time the angle between pushed up surface 38 and an axis of rod 20 is assumed to be θ1) (>90°). When, from this state, hood 12 begins to lower and rod 20 deforms by bending, sliding resistance rapidly decreases, and a valley (near point P5) appears exactly between point P1 and point P3 shown in FIG. 7, and this state is shown in FIG. 8(B). In this state, an angle θ2 between pushed up surface 38 and an axis of rod 20 increases to be more than θ1 (θ2>θ1). When push portion 54 reaches bent portion 60, the state shown in FIG. 8(C) is attained. That is, an angle θ3 between an axis of rod 20 and pushed up surface 38 (a tangent S with respect to a line segment that connects a center of a curvature radius of bent portion 60 with a position at which push portion 54 contacts pushed up surface 38) becomes smaller than an angle θ2 immediately before push portion 54 arrives at bent portion 60, and the angle θ reverses from increasing to decreasing (θ2>θ3). At this time, a sliding resistance that acts upon push portion 54 increases rapidly, and it is possible to generate intermediate peak load P3 shown in FIG. 7.

In the present embodiment, a projecting length [b] of rod 20 from upper end portion 52A of housing 52 is set to be larger than a length [a] from a pushed up position pushed up by rod 20 at hinge arm 30 of hood hinge 16 to bent portion 60, so that when push portion 54 at a distal end portion of rod 20 contacts bent portion 60 of hinge arm 30, a reaction force (intermediate load) can be increased, and a decrease in efficiency of energy absorption can be effectively suppressed.

Supplementary Explanation of the Above Embodiment (1) In the above embodiment, hood hinge 16 is fixed to a cowl top side, but this is not limiting, and the hood hinge may be fixed to a vehicle side structure member such as an apron upper member or the like.

(2) In the above embodiment, a configuration is adopted in which a rear end side of hood 12 is pushed up by rod 20, but this is not limiting, and a configuration may be employed in which a rod pushes up a hood rear portion. This "hood rear portion" of the present invention indicates a portion positioned further to a vehicle rear side than an intermediate portion in a front-rear direction of a hood. Preferably, a portion from a hood rear end to approximately ⅓ of the entire length of the hood is pushed up by a rod. The intermediate portion in a front-rear direction of a hood is excluded because a hood bending bead is sometimes provided at the intermediate portion in a front-rear direction of a hood, and if this portion is pushed up in a hood upwards direction, the hood may bend and deform such that the hood rear end portion does not rise.

(3) Supplementary explanation of terminology is provided below

First, the "bending portion" of the present invention indicates a connection portion, in which bent portion 60 of the embodiments bends from a front portion along an intermediate portion, when hinge arm 30 is seen in a side view at the normal time shown in FIG. 1 (a state in which actuator 18 is not operated); the "bending portion" of the present invention is used with this meaning. Incidentally, when the hood is maintained in a pushed up portion as shown in FIG. 4, hinge arm 30 is bent (curves) at a position slightly to a hood rear side of bolt head portion 44A at a rear side hinge bolt 44 (at a base portion rear end of rear end expanding portion 34A); however, since the bending deformation generated at this time generally returns to its original state when hood 12 lowers, this curving region is not the "bending portion" of the invention. In other words, the "bending portion" of the present invention means a bending portion of a hinge arm of a vehicle pop up hood apparatus when not in an operated state.

Figure 9:
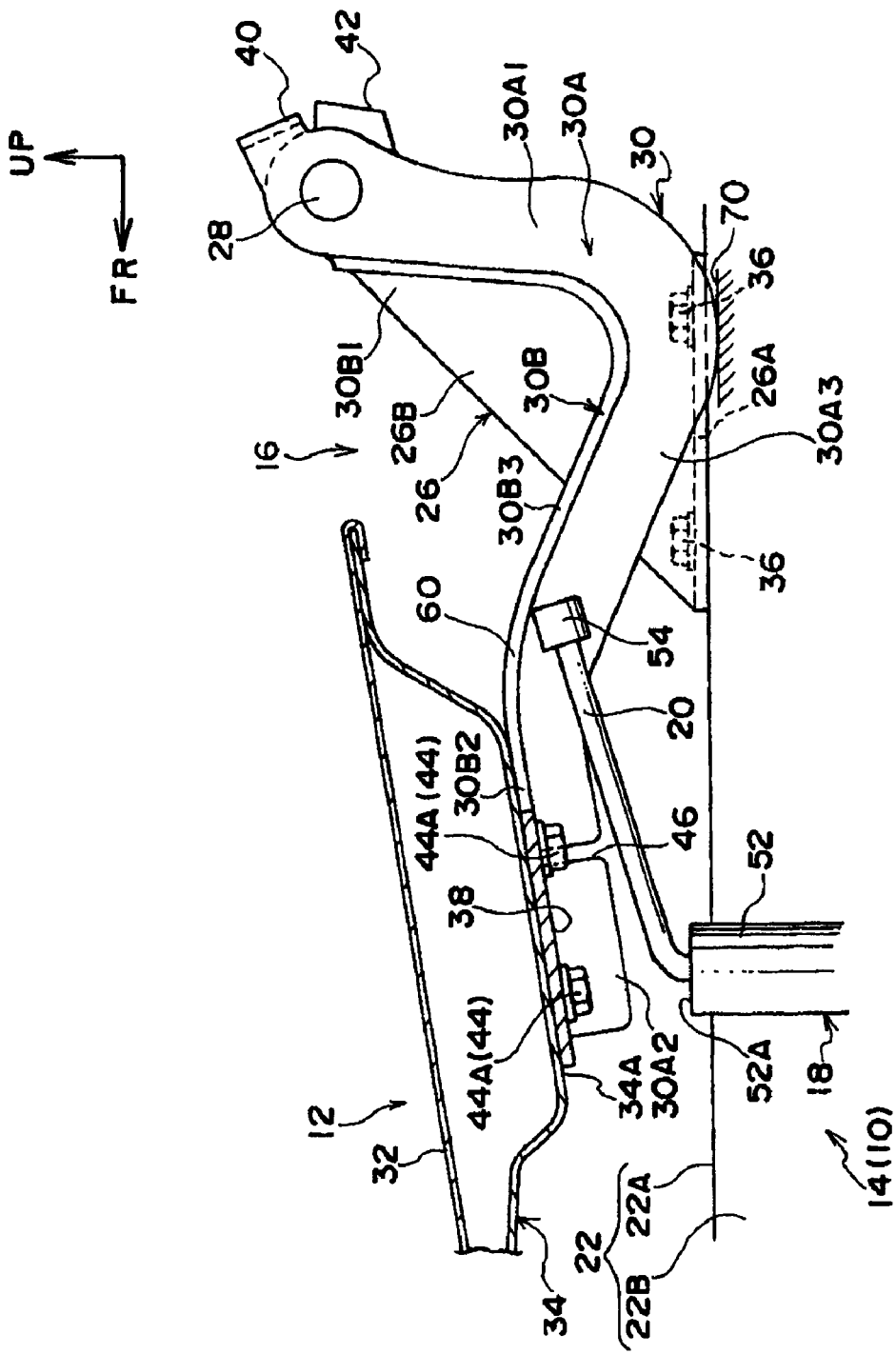
FIG. 9 is a side view corresponding to FIG. 6, showing a state in which the base of the hinge arm contacts a body side instead of an actuator side.

The following concerns a "base contact" of the present invention. In the above embodiments, explanation is given of an example in which a base of a lower end portion of hinge arm 30 contacts a bending portion of a base of rod 20 which has deformed by bending, or contacts upper end portion 52A of housing 52. However, this is not limiting, and also includes a state of contacting cowl top side 22 and, as shown in FIG. 9, a cowl 70 that is positioned below upper surface portion 22A of cowl top side 22, and a state of contacting an apron upper member in an FF (Front engine, Front wheel drive) layout vehicle or the like.

(4) In the above embodiment, hinge arm 30 has an approximate "Z" shape in a side view. However, this "approximate 'Z' shape", may be any shape which has an attachment portion to hood 12 and a connection portion to hinge base 26, and that connects these two elements and slopes in a direction inclined with respect to a vehicle front-rear direction. This shape may also appear to be an approximate "L" shape, or an approximate "S" shape depending on the manner in which it is viewed.

What is claimed is:

1. A vehicle pop up hood apparatus, comprising:
   an actuator mounted at a vehicle;
   a rod that extends towards a hood upper side as a result of operation of the actuator, pushes a hood rear portion, which is supported such that it may open and close with respect to a vehicle body side via a hood hinge, towards a hood upper side, and maintains the hood at a pushed up position; and
   an energy absorbing mechanism portion, which, in a state in which the hood is maintained in the pushed up position, when a collision load equal to or greater than a predetermined value acts from a hood upper side upon an area near a pushed up region pushed up by the rod, slides a distal end portion of the rod towards a vehicle rear side along a pushed up surface of a hood rear portion, while deforming the rod by bending, thereby absorbing energy from a collision body;
   wherein between a point at which a first period peak load is generated before the rod begins to bend, and a point at which a final period peak load is generated when a hood lowers and a base of a hood side attachment member of a hood hinge contacts another element, an angle θ between an axis of the rod and the pushed up surface increases from a first value to a second value, and then decreases from the second value to a third value, thereby increasing sliding resistance and generating an intermediate peak load; and
   wherein when the rod contacts a bent portion of the pushed up surface, the angle θ is defined as an angle between the axis of the rod and a tangent to a line segment connecting a center of curvature radius of the bent portion with a position at which the rod contacts the pushed up surface.

2. The vehicle pop up hood apparatus of claim 1, wherein the rod is housed in a housing of the actuator that pushes up the rod, and the hood side attachment member of the hood hinge has an approximate "Z" shape when seen from a hood side direction, and a projecting length b of the rod from the housing is longer than a length a from a pushed up position of the hood side attachment member pushed up by the rod, to a bending portion of the hood side attachment member.

3. The vehicle pop up hood apparatus of claim 1, wherein the hood hinge is fixed to a cowl top side.

* * * * *